United States Patent
Hyllstam et al.

(10) Patent No.: US 6,238,196 B1
(45) Date of Patent: May 29, 2001

(54) MOLDING APPARATUS

(75) Inventors: Mari Hyllstam, Lund; Sten Påhlsson, Ödåkra, both of (SE)

(73) Assignee: Frigoscandia Eguipment AB, Helsingborg (SE)

( * ) Notice: Subject to any disclaimer, the term of this patent is extended or adjusted under 35 U.S.C. 154(b) by 0 days.

(21) Appl. No.: 09/421,531

(22) Filed: Oct. 20, 1999

Related U.S. Application Data

(63) Continuation of application No. PCT/SE98/00734, filed on Apr. 23, 1998.

(30) Foreign Application Priority Data

Apr. 24, 1997 (SE) .................................................. 9701534

(51) Int. Cl.⁷ .................................................. B29C 47/92
(52) U.S. Cl. .......................... 425/139; 425/150; 425/157; 425/557; 425/575
(58) Field of Search .................................. 425/155, 157, 425/139, 149, 150, 557, 575, 576; 426/513

(56) References Cited

U.S. PATENT DOCUMENTS

| | | | |
|---|---|---|---|
| 4,182,003 | 1/1980 | Lamartino et al. | 17/32 |
| 4,411,609 * | 10/1983 | Yoshii et al. | 425/149 |
| 4,768,260 * | 9/1988 | Sandberg | 17/32 |
| 4,975,039 | 12/1990 | Dare et al. | 425/238 |
| 5,316,707 * | 5/1994 | Stanciu et al. | 264/40.1 |
| 5,401,156 * | 3/1995 | Anderson | 425/147 |
| 5,522,713 * | 6/1996 | Lian | 425/116 |
| 5,611,975 * | 3/1997 | Kamiguchi et al. | 264/40.1 |
| 5,618,571 * | 4/1997 | London et al. | 425/512 |
| 5,795,610 * | 8/1998 | London | 425/512 |

FOREIGN PATENT DOCUMENTS

| | | |
|---|---|---|
| 0 311 055 | 4/1989 | (EP) . |
| 428 752 | 7/1983 | (SE) . |

\* cited by examiner

*Primary Examiner*—Harold Pyon
*Assistant Examiner*—Emmanuel Luk
(74) *Attorney, Agent, or Firm*—Browdy And Neimark

(57) ABSTRACT

An apparatus for molding food products of a moldable food material having a molding compartment, a feeding device for feeding the food material to the molding compartment and a molding plate with a mold cavity. The molding plate is moveable between a forwarding position in which the mold cavity communicates with the molding compartment via a molding opening, and an ejection position, in which the mold cavity is open towards a base. A plunger assembly fills the mold cavity with the food material from the molding compartment via the mold opening, and a piston ejects a food product molded in the mold cavity from the molding plate in the ejection position. A common, programmable control unit predetermines the periodical movements of the feeding device, the plunger assembly and the molding plate as a function of time in the form of separate movement patterns.

9 Claims, 3 Drawing Sheets

MOLDING APPARATUS

Figure 1:
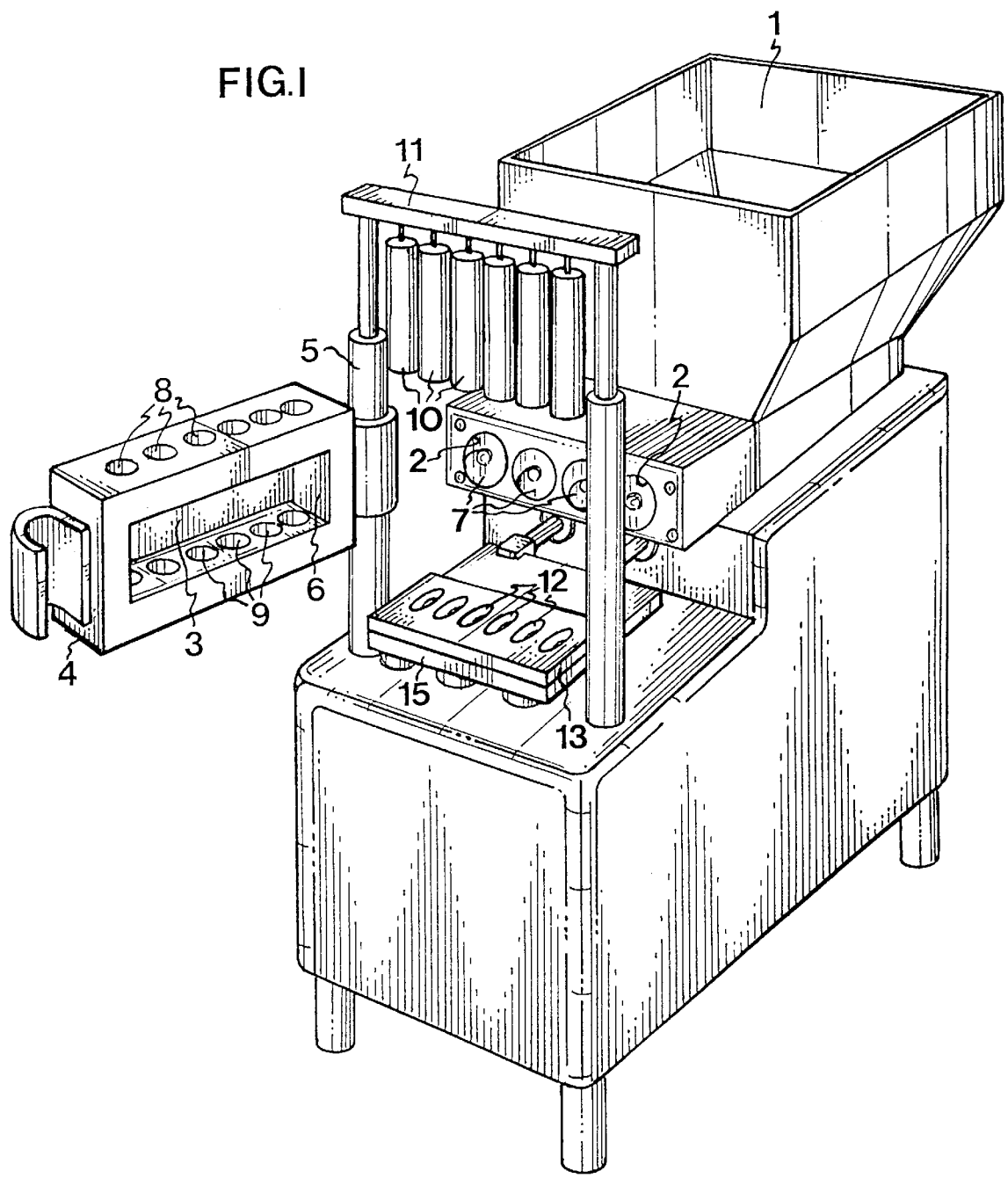

This application is a continuation of PCT application No. PCT/SE98/00734 filed on Apr. 23, 1998.

BACKGROUND OF THE INVENTION

Technical Field of the Invention

The present invention relates to an apparatus for moulding food products of mouldable food materials.

More specifically, the invention concerns such an apparatus as has a moulding compartment for the mouldable food material, a feeding device for feeding the mouldable food material to the moulding compartment, a moulding plate with a mould cavity, said moulding plate being movable between a feeding position, in which the mould cavity communicates with the moulding compartment via a moulding opening, and an ejection position, in which the mould cavity is open towards a base, a plunger assembly for filling the mould cavity with the food material from the moulding compartment via the moulding opening, and a means for ejecting a food product moulded in the mould cavity from the moulding plate in the ejection position.

A moulding apparatus of this kind comprises a plurality of movable parts, the movements of which are to be coordinated and may need adjustment relative to each other. For the driving of the various parts, the prior-art technique utilises an electric motor, which via cam discs, cranks and the like controls the movement pattern of the various parts. To achieve the desired movements, a hydraulic system can also be used to supplement the electric motor or, alternatively, to replace the same. Examples of known moulding apparatus are to be found in, for instance, U.S. Pat. No. 4,975,039 and GB Patent 1,219,452.

In consequence of the many movable parts and the necessary coordination of the various movements, the driving of the prior-art moulding apparatus is complicated. The prior-art moulding apparatus are also not very suited for adaptation of the driving to the different products based on different mouldable food materials which each have specific properties.

An object of the present invention therefore is to simplify the driving of a moulding apparatus of the type described by way of introduction, such that both the coordination of the different movements and the appearance of each individual movement can be controlled and changed in a quick and reliable manner. As a result, it should also be possible to give the mouldable food product a very kind treatment, such that the quality of the moulded food product becomes high.

This object is achieved by the moulding apparatus being given the distinguishing features that are evident from appended claim 1. Preferred embodiments of the inventive moulding apparatus appear from the dependent claims.

According to the invention, use is thus made of a common, programmable control unit for predetermining the movements of the feeding device, the plunger assembly and the moulding plate as a function of time in the form of separate, periodical movement patterns, which have the same predeterminable period and a predeterminable time relationship between each other. Moreover use is made of a separate drive unit for each of the feeding device, the plunger assembly and the moulding plate for controlling the movement of each of them into continuous agreement with the respective one of movement patterns predetermined by the common, programmable control unit.

The separate drive unit for the plunger assembly and the moulding plate, respectively, may comprise a servo-operated motor capable of taking positions in accordance with the predetermined movement pattern, which comprises both the extent of the movement, i.e. the length and position of the path of movement, and the speeds of the movement in each period, i.e. residence times in points at zero speed and speed variations between these points.

The common, programmable control unit comprises a programmable logic circuit of a known kind and output circuits which are also of a known kind for transmitting driving signals of a suitable form for the various drive units.

The feeding device has suitably at least two feed screws for feeding the mouldable food material to the moulding compartment from a storage container. The separate drive unit for the feeding device may then comprise a servo-operated motor capable of rotating the feed screws according to the predetermined movement pattern, which in this case comprises the variation of the rotational speed during each period.

The common, programmable control unit is in the first place programmable in respect of the length of the period, but it is suitably also programmable in respect of length and position of the movement of the moulding plate, especially the position of the feeding position, the residence time of the moulding plate in the feeding position and its residence time in the ejection position as well as the velocity profile at least for the movement of the moulding plate from the feeding position to the ejection position.

Moreover, the common, programmable control unit is preferably programmable in respect of the synchronisation of the movement pattern of the plunger assembly relative to the movement pattern of the moulding plate. It is also in this case very important for the length and the position of the movement of the plunger assembly to be programmable, as are the residence times of the plunger assembly in inoperative positions and the profiles or variation of its speeds between these positions.

Further preferred programming possibilities of the common, programmable unit will appear from the following specification of a preferred embodiment.

It will be appreciated that the inventive moulding apparatus for food products has a number of advantages compared with the prior-art moulding apparatus. Thus, the programmable control unit may comprise a plurality of programs for a food product each, such that the apparatus can very easily be adjusted for the manufacture of a food product of current interest.

By the program control and the separate drive units, corrections can also be easily carried out in consideration of minor deviations between the properties which a stored program assumes for a mouldable food material and the properties of a particular volume of this food material.

The use of separate drive units also implies that a change of the movement pattern for one drive unit does not necessarily affect the movement pattern for another drive unit. However, the synchronisation between the different drive units can easily be changed by using the program control and the separate drive units.

According to the food product, the time for each period or each cycle that the moulding apparatus performs can thus be varied very easily to a value which is optimal for each individual food product and each run.

Each individual movement pattern can, of course, be changed from one run to the next, for instance, the period can be changed, i.e. the number of produced products per unit of time, without changing the movement pattern in that part which concerns the filling of the mould cavity of the moulding plate. It is also possible to vary the movement pattern from cycle to cycle, i.e. during a run.

Figure 2:
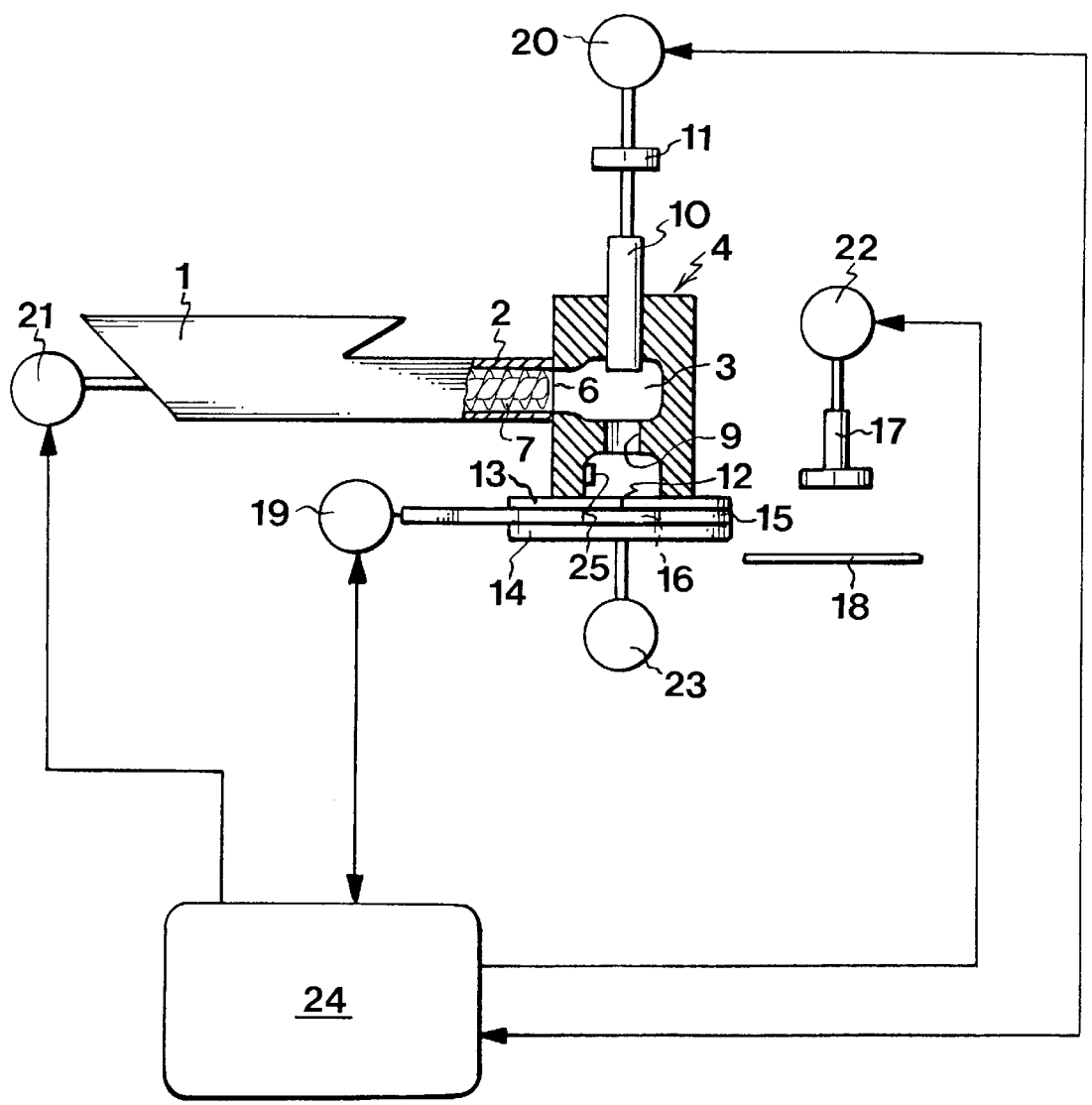

An embodiment of the invention will now be described in more detail with reference to the accompanying drawings, in which FIG. 1 is a schematic perspective view of a moulding apparatus, to which the present invention is applicable, FIG. 2 is a block diagram of an embodiment of an inventive moulding apparatus, and FIGS. 3A–3D are diagrams for illustrating the movement pattern of some of the parts of the moulding apparatus illustrated in FIG. 2.

The moulding apparatus shown in FIG. 1 comprises a storage container 1, which is open upwards for filling with a mouldable food material, e.g. minced meat. It comprises a plurality of ducts 2, which are circular in cross-section and which extend horizontally away from the lower part of the storage container 1. The ducts 2 lead into a moulding compartment 3 in a mould casing 4. This is mounted pivotally about a vertical shaft 5 between the open position shown in FIG. 1 and a closed position shown in FIG. 2, in which the mould casing 4 is pivoted towards the ducts 2, and a side opening 6 of the moulding compartment 3 communicates with the outer mouths of the ducts 2.

In each duct 2, a feed screw 7 is mounted for feeding the food material from the storage container 1 to the moulding compartment 3 of the mould casing 4. In addition to the side opening 6, the moulding compartment 3 has six upper openings 8 and six lower openings 9, all of them being circular in cross-section. The upper openings 8 are axially aligned each with one of the lower openings 9. Six filling plungers 10 are mounted on a frame 11 for vertical movement parallel with each other, each through one of the openings 8 and also one of the openings 9. The moulding compartment 3 has an upper part, into which both the side opening 6 and all the openings 8 and 9 lead, and a lower part, into which the lower openings 9 lead, as well as moulding openings 12 which are formed in a plate 13 fixedly mounted under the mould casing 4 in the closed position thereof (see FIG. 2). However, the plate 13 is exchangeable since the moulding openings 12 are specially designed for each individual food product.

The number of filling plungers 10 is directly dependent on the width of the moulding apparatus, and this also applies to the number of feed screws 7. The number of moulding openings 12, however, is dependent on the particular food product.

A supporting plate 14 is arranged under the mould casing 4 in the closed position thereof and is movable in the vertical direction. In a gap formed between the underside of the plate 13 and the upper side of the supporting plate 14, a moulding plate 15 is reciprocatable in the horizontal direction. In the moulding plate 15, a through mould cavity 16 is formed for each moulding opening 12 in the plate 13. Like the moulding openings 12, the mould cavities 16 are specially designed for each individual food product.

In a feeding position for the moulding plate 15, the mould cavities 16 are located each under one of the moulding openings 12 in the plate 13. In an ejection position, the moulding plate 15 is moved away from the mould casing 4 and the supporting plate 14, such that the mould cavities 16 are freely accessible to ejection plungers 17 shown in FIG. 2, which are arranged to eject, by a vertically downward movement, the food products formed in the mould cavities 16 onto a receiving base 18, for instance, a conveyor belt.

The block diagram in FIG. 2 schematically shows the apparatus in FIG. 1 as well as drive units 19–22 and a control unit 24 which is common to these drive units.

More specifically, use is made of electric motors as the drive units 19–21 which produce a translational movement of the moulding plate 15 and of the frame 11 with the filling plungers 10 as well as a rotary movement of the feed screws 7. The translational movements are produced via some suitable means for converting a rotary movement to a linear movement, e.g. a screw-and-nut coupling. The electric motors 19–21 are of the servomotor type, such that the control unit 24 in each moment has information on the position of the moulding plate 15 and the position of the filling plungers 10 as well as the rotational speed of the feed screws 7.

The common control unit 24 comprises a PLC system, such that the movement pattern for each of the driven means 7, 10 and 15 can easily be programmed or adjusted and can just as easily be changed both for one and the same food product and from one food product to another. This PLC system drives each of the electric motors 19–21 via a servo-amplifier. The electric motors 19–21 further each have a rotational position transducer for feed-back coupling to the respective servo-amplifiers and to the PLC system in respect of the electric motors 19 and 20. The PLC system can thus control the rotational position of the electric motors 19 and 20 and the rotational speed of the electric motor 21 as a function of time in conformity with a predetermined movement pattern of the respective electric motors.

The control unit 24 also controls the drive unit 22 which can be electric and is adapted to periodically perform a quick reciprocating movement to make the ejection plungers 17 eject the moulded products from the mould cavities 16.

A drive unit 23, which is adapted to exert, during a short interval, an increased pressure upon the underside of the moulding plate 15, is usually controlled by the pressure in the moulding compartment 3, but it can also be controlled directly from the control unit 24.

Figure 3:
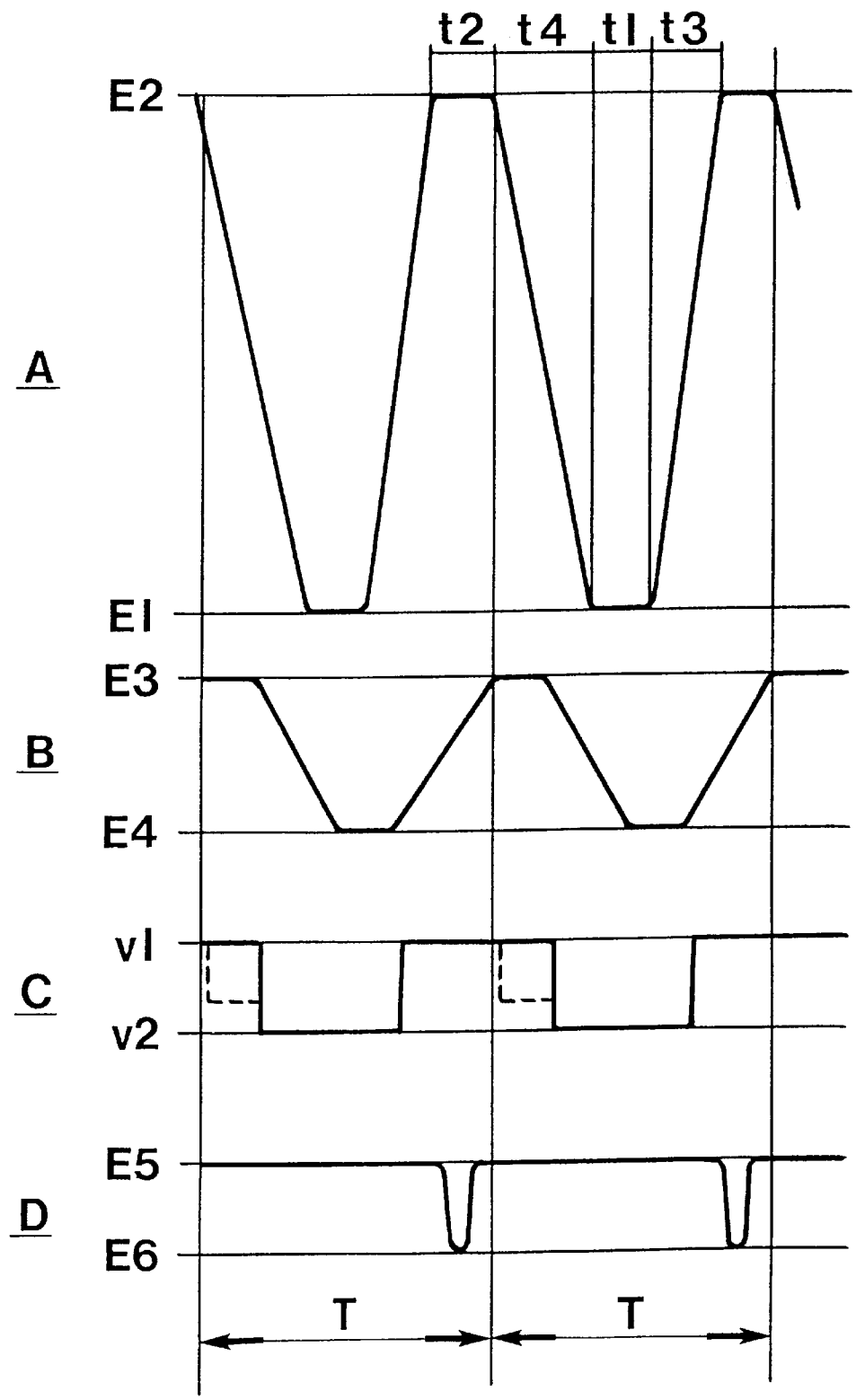

FIG. 3 shows an example of movement patterns for the moulding plate 15, the filling plungers 10, the feed screws 7, the ejection plungers 17 and the supporting plate 14. Since the movement patterns are periodical, only two periods or cycles are shown.

FIG. 3A shows the movement pattern of the moulding plate 15, which moulding pattern guides the movement patterns of the filling plungers 10, i.e. the latter is dependent on, but not unambiguously determined by the former. The moulding plate 15 has predetermined, but variable inner and outer end positions E1 and E2. The period T, which is the sum of the various movement times and inoperative times, for instance, the inoperative times t1 and t2 of the moulding plate 15 and the movement times t3 and t4 of the same, determines how many food products are to be produced per unit of time. This period T is a primary parameter which is adjustable in the control unit 24.

The residence time t1 in the inner end position E1 is determined by the time necessary for the filling of the mould cavities 16 with the mouldable food material by means of the filling plungers 10. The residence time t2 in the outer end position E2 is in turn determined by the time required for the ejection plungers 17 to have time to eject the moulded food products and move away from the mould cavities 16, such that the moulding plate 15 can be withdrawn under the mould casing 4. When changing the period T, the residence time t2 is in the first place changed to the same extent, provided that the minimum value of t2 can be maintained.

It should, however, be noted that the filling of the mould cavities 16 can begin before the moulding plate 15 has reached and stopped in the inner end position E1, and can continue after the moulding plate 15 has begun its movement towards the outer end position E2. The point of time when the filling can begin is decided by the point of time when a connection first arises between the moulding compartment 3 and the mould cavities 16 via the moulding openings 12 during the movement of the moulding plate 15 towards the inner end position E1. Correspondingly, the point of time when this connection ceases during the movement of the moulding plate 15 from the inner end position E1 decides when the filling must cease. In other words, the filling time is normally longer than the residence time t1 of the moulding plate. 15 in the inner end position E1.

The time t3 for the movement of the moulding plate 15 from the inner end position E1 to the outer end position E2 is dependent on, for instance, the consistency of the food material at issue. By letting the moulding plate 15 start and end this movement in a soft manner, i.e. with successively increasing and decreasing speed, also the length of the time t3 can be affected. The time t4 for the movement of the moulding plate 15 back from the outer end position E2 to the inner end position can be made equal to the time t3, but can also be made shorter since the mould cavities 16 are empty at least during the main part of this movement.

As stated above, the control unit 24 is normally, especially when running a fixed program, designed such that a change of the period T in the first place affects the residence time t2 in the outer end position E2, but it is also possible that one or some of the times t1, t3 and t4 will be affected.

FIG. 3B shows a possible movement pattern for the filling plungers 10, said movement pattern being displaceable relative to the movement pattern for the moulding plate 15 but, of course, it has the same period as the latter movement pattern. The filling plungers 10 have an upper and a lower end position E3 and E4, respectively, especially the residence time in the lower end position being adjustable according to the invention in dependence on the food material at issue. Both end positions E3 and E4 can also be adjustable separately, or one end position, for instance, the upper end position E3, can be adjustable in combination with adjustability in respect of the length of stroke of the filling plungers 10. It should also be noted that the filling plungers 10 can be inoperative in one or more points between the end positions E3 and E4. For example, it may be advantageous to have an inoperative position adjacent to the lower end position E4, the movement up to the end position E4 being used to accomplish the desired refilling by means of an additional pressure increase in the lower part of the moulding compartment 3.

The lower end position E4 thus is important to how well the mould cavities 16 are filled. It may be noted that the filling plungers 10 in the example shown begin their downward movement from the upper end position E3 before the moulding plate 15 has reached its inner end position E1 during the movement from the outer end position E2, i.e. the filling of the mould cavities 16 can already start when the mould cavities 14 communicate with a part of the respective moulding opening 12. The filling plungers 10, on the other hand, do not begin their movement back from the lower end position E4 to the upper end position E3 until the moulding plate 15 has been displaced so far from the inner end position E1 towards the outer end position E2 that the moulded product in the mould cavities 16 is not affected by the upwards return movement of the filling plungers 10.

As shown in FIG. 3C the feed screws 7 are driven at a speed v1 by the drive unit 21 at least during the period when the filling plungers 10 are moved upwards in their return movement from the lower end position E4 to the upper end position E3, such that the volume of the food material which has been pressed into the mould cavities 16 by means of the filling plungers 10 is replaced with a corresponding volume of the food material from the storage container 1. Therebetween the feed screws 7 are driven at a speed v2 which can be zero. Alternatively, the feed screws 7 can be driven at a speed which is between the speeds v1 and v2, during approximately the interval when the plungers 10 are located in their upper position E3, as indicated by dashed portions in FIG. 3. The shift from the speed v2 to the speed v1 is in FIG. 3 shown to approximately coincide with the start of the return movement of the plungers 10 upwards from the lower end position E4, but the shift could take place before that, for instance, even when the plungers 10 reach the lower end position E4.

In a preferred embodiment, the feed screws 7 are not stopped during any part of the operation of the apparatus but are given a rotational speed which is dependent on the pressure in the moulding compartment 3. To this end, a pressure sensor 25 can be arranged to sense the pressure in the moulding compartment 3 and transmit a corresponding signal to the control unit 24 which can then control the rotational speed of the feeding screws 7 in a predetermined relationship to the pressure that momentarily prevails in the moulding compartment 3, especially in the lower part thereof. The same pressure sensor 25 or a similar pressure sensor in the moulding compartment 3 can be used to determine the lower end position E4 for the filling plungers 10.

FIG. 3D shows a suitable movement pattern for the ejections plungers 17. They move between an upper end position E5 and a lower end position E6. The movement is of course adjusted to the residence time t2 of the moulding plate 15 in the ejection position E2, and must, in each case, be within this residence time when some part of the ejection plungers 17 is positioned inside the mould cavities 16.

The drawings do not show the movement pattern for the supporting plate 14, but it will be appreciated that the drive unit 23 thereof should be arranged to press it upwards to the moulding plate 15, such that the upper side thereof is in turn pressed up against the underside of the plate 13 and the mould casing 4, at least during the filling of the mould cavities 16 in the moulding plate 15.

Summing up, it should be emphasised that the movements of the moulding plate 15 constitute a reference for the movements of the filling plungers 10, which in turn constitute a reference for the movements of the feed screws 7.

Several modifications of the above embodiment of a moulding apparatus according to the present invention are obvious to those skilled in the art and are within the scope of the invention as defined by the appended claims.

What is claimed is:

1. An apparatus for molding food products of a moldable food material, said apparatus comprising:
   a molding compartment for the moldable food material,
   a feeding device for feeding the moldable food material to the molding compartment,
   a molding plate with a mold cavity, said molding plate moves between a feeding position, in which the mold cavity communicates with the molding compartment via a molding opening, and an ejection position, in which the mold cavity is open towards a base,
   a plunger assembly for filling the mold cavity with the food material from the molding compartment via the molding opening, and means for ejecting a food product molded in the mold cavity from the molding plate in the ejection position, said apparatus further comprising a common, programmable control unit for predetermining the movements of the feeding device, the plunger assembly and the molding plate as a function of time in the form of separate, periodical movement patterns, which have a same predeterminable period and a predeterminable time relationship between each other and a separate drive unit for each one of the feeding device, the plunger assembly and the molding plate for controlling the movements of each of them in continuous agreement with the respective one of movement patterns predetermined by the common, programmable control unit, wherein the separate drive unit for each one of the feeding device, the molding plate and the plunger assembly, respectively, comprises a servo-operated motor which follows a predetermined movement pattern, and wherein the common, programmable control unit is programmed in respect to a) a length of the predeterminable period, b) synchronization of a movement pattern of the plunger assembly relative to a movement pattern of the molding plate, c) synchronization of a movement pattern of the feeding device relative to a movement pattern of the plunger assembly d) end positions of a movement of the molding plate, e) a resident time of the molding plate in a feeding position and residence time thereof an ejection position, f) at least an end position of the plunger assembly closest to the molding opening, and g) a residence time of the plunger assembly at least in an end position thereof closest to the molding opening.

2. The apparatus as claimed in claim 1, wherein the feeding device comprises at least two feed screws and the servo-operated motor of the feeding device rotates the feed screws in accordance with the predetermined movement pattern, including varying velocities in accordance with velocity profile programmed in the common, programmable control unit.

3. An apparatus as claimed in claim 1, wherein the common, programmable control unit (24) is programmable in respect of the velocity profile at least for the movement of the moulding plate (15) from the feeding position (E1) to the ejection position (E2).

4. An apparatus as claimed in claim 1, wherein the common, programmable control unit (24) is programmable in respect of the velocity profile at least for the movement of the plunger assembly (10) for filling the mould cavity (16).

5. An apparatus as claimed in claim 1, wherein a pressure sensor (25) is adapted to sense the pressure in the moulding compartment (3), and that the common, programmable control unit (24) is adapted to determine one end position (E4) of the plunger assembly (10) in dependence on the pressure sensed by the pressure sensor.

6. An apparatus as claimed in claim 1, wherein the common, programmable control unit (24) is programmable in respect of the velocity profile for the feeding device (7) during each period (T).

7. An apparatus as claimed in claim 1, wherein the movement pattern of the common, programmable control unit (24) for the drive unit (21) of the feeding device (7) comprises rotation of the feed screws at a higher speed when the plunger assembly (10) does not fill the mould cavity (16) of the moulding plate (15) with the mouldable food material.

8. An apparatus as claimed in claim 1, wherein a pressure sensor (25) is adapted to sense the pressure in the moulding compartment (3), and that the common, programmable control unit (24) is adapted to control the speed of rotation of the feed screws (7) in dependence on the sensed pressure.

9. An apparatus for molding food products of a moldable food material, said apparatus comprising:

a molding compartment for the moldable food material, a feeding device for feeding the moldable food material to the molding compartment, a molding plate with a mold cavity, said molding plate moves between a feeding position, in which the mod cavity communicates with the molding compartment via a molding opening, and an ejection position, in which the mold cavity is open towards a base, a plunger assembly for filling the mold cavity with the food material from the molding compartment via the molding opening, and means for ejecting a food product molded in the mold cavity from the molding plate in the ejection position, said apparatus further comprising a common, programmable control unit for predetermining the movements of the feeding device, the plunger assembly and the molding plate as a function of time in the form of separate, periodical movement patterns, which have the same predeterminable period and a predeterminable time relationship between each other, and a separate drive unit for each one of the feeding device, the plunger assembly and the molding plate for controlling the movements of each of them in continuous agreement with the respective one of movement patterns predetermined by the common, programmable control unit, wherein the separate drive for the feeding, device, the molding plate and the plunger assembly, respectively comprise a servo-operated motor which is capable of taking positions in accordance with the predetermine movement pattern, and wherein the common, programmable control unit is programmed in respect to a) a length of the predeterminable period, b) synchronization of a movement pattern of the plunger assembly relative to a movement pattern of the molding plate, c) synchronization of a movement pattern of the feeding device relative to a movement pattern of the plunger assembly, d) end posit ions of a movement of the molding plate, e) residence time of the molding plate in the feeding position and residence time thereof in an ejection position, f) velocity profile at least for a movement of the molding plate from the feeding position of an ejecting position, g) at least an end position of the plunger assembly closes to the molding opening, h) residence time of the plunger assemble at least in an end position thereof closest to the molding opening, i) length of a stroke of the plunger assembly, j) velocity profile at least for a movement of the plunger assembly for filing the mold cavity, and k) velocity profile for the feeding device during each period.

\* \* \* \* \*